(12) United States Patent
Brown et al.

(10) Patent No.: US 10,359,802 B2
(45) Date of Patent: Jul. 23, 2019

(54) VARIABLE FORCE ELECTRONIC VEHICLE CLUTCH PEDAL

(71) Applicant: CTS Corporation, Lisle, IL (US)

(72) Inventors: Steven Brown, Armadale (GB); Gerard McCafferty, Glasgow (GB); Rory Belshaw, Glasgow (GB)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 15/681,401

(22) Filed: Aug. 20, 2017

(65) Prior Publication Data

US 2018/0052483 A1 Feb. 22, 2018

Related U.S. Application Data

(60) Provisional application No. 62/378,038, filed on Aug. 22, 2016.

(51) Int. Cl.
*G05G 5/03* (2008.04)
*B60T 7/04* (2006.01)
(Continued)

(52) U.S. Cl.
CPC .................. *G05G 5/03* (2013.01); *B60T 7/04* (2013.01); *B60W 10/02* (2013.01);
(Continued)

(58) Field of Classification Search
CPC ............ G05G 1/30; G05G 1/44; G05G 1/445; G05G 5/03; B60T 7/04;
(Continued)

(56) References Cited

U.S. PATENT DOCUMENTS

| 4,796,739 A | 1/1989 | Jonner et al. |
| 5,080,207 A | 1/1992 | Horneffer et al. |

(Continued)

FOREIGN PATENT DOCUMENTS

| CN | 204488504 U | 7/2015 |
| CN | 105216622 A | 1/2016 |

(Continued)

OTHER PUBLICATIONS

Welter, et al: Clutch Operation; Schaeffler Symposium 2010; http://www.schaeffler.com/remotemedien/media/_shared_media/08_media_library/01_publications/schaeffler_2/symposia_1/downloads_11/schaeffler_kolloquium_2010_04_en.pdf.

(Continued)

*Primary Examiner* — Prasad V Gokhale
(74) *Attorney, Agent, or Firm* — Daniel Deneufbourg

(57) ABSTRACT

An electronic vehicle clutch pedal comprising a pedal housing and a pedal arm coupled to and rotatable relative to the housing and including a distal drum rotatable relative to the pedal housing and defining a contact surface including at plurality of surface segments with different slopes. A force lever is pivotable about the pedal housing and has a first end abutted against the contact surface on the drum of the pedal arm. A compressible member has a first end abutted against a lower surface of the pedal arm and a second end abutted against a second end of the force lever. The pedal arm is rotatable about the pedal housing to cause the pivoting of the force lever relative to the pedal housing and cause the first end of the compressible member to exert a variable force against the pedal arm.

9 Claims, 7 Drawing Sheets

(51) Int. Cl.
*B60W 10/02* (2006.01)
*B60W 30/18* (2012.01)
*G05G 1/445* (2008.04)
*G05G 1/30* (2008.04)

(52) U.S. Cl.
CPC ........... *B60W 30/1819* (2013.01); *G05G 1/30* (2013.01); *G05G 1/445* (2013.01); *B60W 2510/0225* (2013.01); *B60W 2540/14* (2013.01); *B60W 2710/022* (2013.01); *F16D 2500/31413* (2013.01)

(58) Field of Classification Search
CPC ............ F16D 2500/31413; B60W 2510/0225; B60W 2540/14; B60W 2710/022
USPC .......................................... 74/512, 560, 561
See application file for complete search history.

(56) References Cited

U.S. PATENT DOCUMENTS

| | | | |
|---|---|---|---|
| 5,133,225 | A | 7/1992 | Lundberg et al. |
| 5,215,176 | A | 6/1993 | Hamann et al. |
| 5,237,891 | A | 8/1993 | Lundberg et al. |
| 5,408,899 | A | 4/1995 | Stewart |
| 5,964,125 | A | 10/1999 | Rixon et al. |
| 6,101,896 | A | 8/2000 | Engelgau et al. |
| 6,234,290 | B1 | 5/2001 | Drexl et al. |
| 6,253,635 | B1 | 7/2001 | Huber |
| 6,295,890 | B2 | 10/2001 | Rixon et al. |
| 6,330,838 | B1 | 12/2001 | Kalsi |
| 6,540,059 | B2 | 4/2003 | Drexl |
| 6,626,061 | B2 | 9/2003 | Sakamoto et al. |
| 6,684,987 | B2 | 2/2004 | Stachowski et al. |
| 6,758,114 | B2 | 7/2004 | Sundaresan et al. |
| 6,857,336 | B2 | 2/2005 | Staker |
| 6,860,170 | B2 | 3/2005 | DeForest |
| 6,862,950 | B2 | 3/2005 | O'Neill |
| 7,228,758 | B2 | 6/2007 | Fujiwara |
| 7,337,692 | B2 | 3/2008 | Willemsen et al. |
| 7,401,865 | B2 | 7/2008 | Shaw |
| 7,503,236 | B2 | 3/2009 | Schlabach et al. |
| 7,770,491 | B2 | 8/2010 | Ritter et al. |
| 8,534,157 | B2 | 9/2013 | O'Neill |
| 8,592,701 | B2 | 11/2013 | Lee et al. |
| 8,596,162 | B2 | 12/2013 | Nozu et al. |
| 8,635,930 | B2 | 1/2014 | Willemsen et al. |
| 8,650,984 | B2 | 2/2014 | O'Neill |
| 9,274,541 | B1 | 3/2016 | Ford et al. |
| 2002/0130790 | A1 | 9/2002 | Sherringham |
| 2003/0154817 | A1* | 8/2003 | Staker ..................... G05G 1/30 74/513 |
| 2004/0040408 | A1 | 3/2004 | Shaw et al. |
| 2004/0237700 | A1* | 12/2004 | Wurn ........................ G05G 1/38 74/514 |
| 2005/0223836 | A1 | 10/2005 | Gibson |
| 2006/0163941 | A1 | 7/2006 | von Hayn et al. |
| 2006/0230875 | A1 | 10/2006 | Ouyang |
| 2007/0137400 | A1* | 6/2007 | Campbell ................. G05G 1/38 74/513 |
| 2007/0234842 | A1 | 10/2007 | Elliott |
| 2010/0012442 | A1 | 1/2010 | Koo et al. |
| 2011/0226086 | A1 | 9/2011 | Kirchner |
| 2011/0254358 | A1 | 10/2011 | Strengert et al. |
| 2012/0006149 | A1 | 1/2012 | Galea |
| 2012/0079912 | A1 | 4/2012 | Leone et al. |
| 2013/0091977 | A1 | 4/2013 | Fukushima et al. |
| 2015/0277479 | A1* | 10/2015 | Viethen ................ B60K 26/021 74/560 |
| 2016/0101694 | A1* | 4/2016 | Hallberg .................. G05G 1/44 74/513 |
| 2016/0102997 | A1* | 4/2016 | Wurn ...................... B60T 7/042 74/560 |

FOREIGN PATENT DOCUMENTS

| | | |
|---|---|---|
| CN | 105253013 A | 1/2016 |
| CN | 103723042 B | 2/2016 |
| DE | 19719617 A1 | 11/1998 |
| DE | 102004059053 A1 | 6/2006 |
| DE | 102006026975 A1 | 1/2007 |
| DE | 102006021472 A1 | 11/2007 |
| DE | 102007018962 A1 | 10/2008 |
| DE | 102009036349 A1 | 3/2010 |
| DE | 102010031369 A1 | 1/2012 |
| DE | 102010031372 A1 | 1/2012 |
| DE | 102010031374 A1 | 1/2012 |
| DE | 102010062076 A1 | 5/2012 |
| DE | 102011054655 A1 | 4/2013 |
| DE | 102012202313 A1 | 8/2013 |
| DE | 102012202314 A1 | 8/2013 |
| DE | 102012210359 A1 | 12/2013 |
| DE | 102012217541 A1 | 3/2014 |
| DE | 102012217854 A1 | 4/2014 |
| DE | 102013204702 A1 | 9/2014 |
| DE | 102014208087 A1 | 11/2014 |
| DE | 102013210803 A1 | 12/2014 |
| DE | 102014210490 A1 | 12/2014 |
| DE | 102014211481 A1 | 12/2015 |
| DE | 102015200670 B3 | 2/2016 |
| DE | 102015220669 A1 | 5/2016 |
| EP | 0974886 A2 | 1/2000 |
| EP | 1488298 B1 | 9/2006 |
| EP | 1956462 A2 | 8/2008 |
| EP | 1930614 B1 | 12/2012 |
| EP | 2896539 A2 | 7/2015 |
| EP | 2927062 A2 | 10/2015 |
| EP | 2927063 A2 | 10/2015 |
| EP | 2927528 A2 | 10/2015 |
| EP | 2946964 A1 | 11/2015 |
| EP | 2995833 A1 | 3/2016 |
| FR | 2848518 B1 | 1/2006 |
| FR | 2863556 B1 | 3/2006 |
| FR | 2871112 B1 | 8/2006 |
| FR | 2871113 B1 | 8/2006 |
| FR | 2871114 B1 | 8/2006 |
| GB | 2338774 B2 | 6/2002 |
| GB | 2402992 A1 | 12/2004 |
| WO | 1990014534 | 11/1990 |
| WO | 2005105508 | 11/2005 |
| WO | 2010/022956 A1 | 3/2010 |
| WO | 2014019793 | 2/2014 |
| WO | 2014048661 A1 | 4/2014 |
| WO | 2015165449 | 11/2015 |
| WO | 2015165450 | 11/2015 |
| WO | 2015165451 | 11/2015 |
| WO | 2015165452 | 11/2015 |
| WO | 2015165453 | 11/2015 |
| WO | 2016/066166 A1 | 5/2016 |

OTHER PUBLICATIONS

Kongsberg Automotive: Pedal Box; http://www.kongsbergautomotive.com/products-services/off-highway/cabin/clutch-actuation-systems/pedal-box/.

* cited by examiner

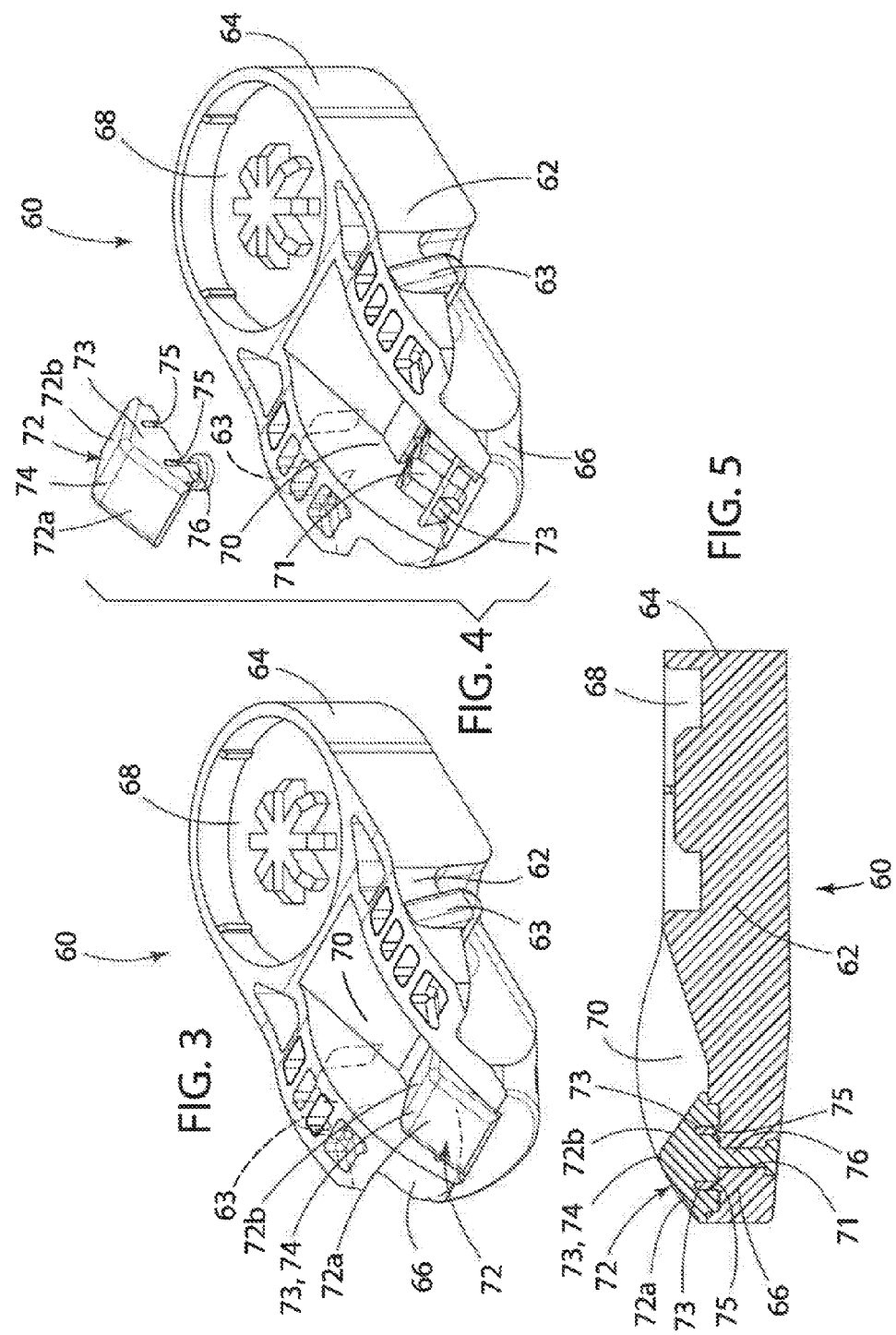

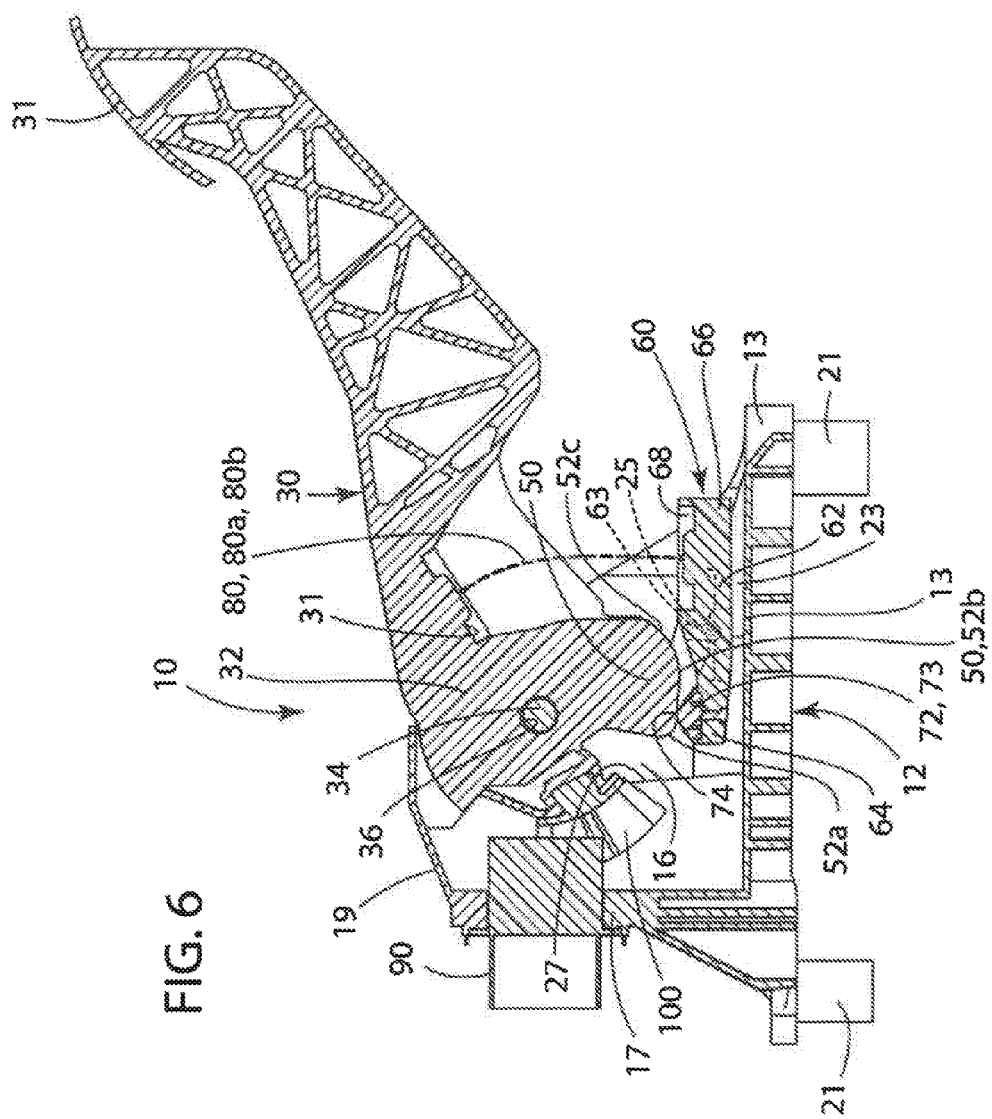

VARIABLE FORCE ELECTRONIC VEHICLE CLUTCH PEDAL

CROSS-REFERENCE TO RELATED APPLICATION

This patent application claims priority and benefit of the filing date of U.S. Provisional Patent Application Ser. No. 62/378,038 filed on Aug. 22, 2016, the disclosure and contents of which is expressly incorporated herein in its entirety by reference.

FIELD OF THE INVENTION

This invention relates generally to an electronic vehicle clutch pedal and, more specifically, to a variable force electronic vehicle clutch pedal.

BACKGROUND OF THE INVENTION

Vehicle clutch pedals have been used in manual transmission vehicles for many years. Clutch pedals are currently of the mechanical type and include a mechanical clutch engagement and disengagement linkage. Specifically, clutch pedals actuate a mechanical system that operates the vehicle's clutch and provides the driver with a force feedback that correlates with the disengagement and engagement of the clutch, allowing the driver to control the clutch by feeling the force through the pedal.

A transition is ongoing to fully electronic clutch pedal solutions in an effort to improve vehicle efficiency and driver comfort. However, simply removing the mechanical output clutch system and adding electronic feedback results in a pedal that does not feel like a clutch and is undesirable because it does not allow the driver to find and feel the clutch engagement and disengagement points.

The present invention is directed to a mechanical linkage free variable force electronic vehicle clutch pedal that includes structure and features adapted to simulate the feel and force of clutch pedals with a mechanical clutch engagement and disengagement linkage.

SUMMARY OF THE INVENTION

The present invention is directed to an electronic vehicle clutch pedal comprising a housing, a pedal arm coupled to and rotatable relative to the housing and including a distal drum rotatable relative to the housing and defining a contact surface including a plurality of surface segments with different slopes, a force lever pivotable about the housing and having a first end abutted against the contact surface on the drum of the pedal arm, and a compressible member having a first end abutted against the pedal arm and a second end abutted against a second end of the force lever, whereby the rotation of the pedal arm results in the pivoting of the force lever and the exertion of a force of varying magnitude on the pedal arm by the compressible member.

In one embodiment, a contact member is mounted on the first end of the force lever and abutted against the contact surface of the drum of the pedal arm.

In one embodiment, the contact member includes a head terminating in a distal tip abutted against the contact surface of the drum of the pedal arm.

In one embodiment, a receptacle is defined in the first end of the force lever, the contact member being located and mounted in the receptacle defined in the first end of the force lever.

In one embodiment, one of the housing or the force lever includes a pair of slots and the other of the pedal housing or the force lever includes a pair of ears extending into the pair of slots respectively for mounting the force lever for pivoting movement about and relative to the housing.

In one embodiment, the contact surface on the drum includes a first rounded surface segment, a second rounded surface segment spaced from the first rounded surface segment, and an elongate straight surface segment therebetween, the contact member on the force lever being adapted to slide along and against the first, second, and third surface segments for generating a variable force on the pedal arm.

The present invention is also directed to an electronic vehicle clutch pedal comprising a housing including a base and a pair of spaced apart side walls together defining an interior cavity, a pedal arm coupled to and rotatable relative to the housing and including a distal drum extending into the cavity of the pedal housing and between the spaced apart side walls, the drum including a nose having an exterior contact surface including a plurality of surface segments with different lengths and slopes, a force lever pivotable about the housing and including a contact member at a first end adapted for sliding contact against the plurality of the surface segments of the contact surface on the nose of the drum; and a compressible member having a first end abutted against an underside of the pedal arm and a second end abutted against a second end of the force lever, whereby the pedal arm is rotatable about the pedal housing to cause the pivoting of the force lever relative to the housing and cause the compressible member to exert a variable force against the pedal arm.

The present invention is further directed to an electronic vehicle clutch pedal comprising a housing including a base having a pair of spaced apart ledges defining respective spaced apart and co-linear slots, a force lever including a pair of spaced apart ears, the force lever being seated on the base of the housing in a relationship with the respective pair of ears seated in the respective slots defined in the respective ledges for mounting the force lever for pivoting movement about the base of the housing, a pedal arm extending into and rotatable about the housing and including a nose in abutting contact with one end of the force lever, and a compressible member including one end abutted against the other end of the force lever and another end abutted against an underside of the pedal arm, whereby the rotation of the pedal arm relative to the housing results in the rotation of the nose of the pedal arm which results in the movement of the one end of the force lever which results in the pivoting of the force lever which results in the compression of the compressible member and the application of a force of varying magnitude on the pedal arm.

In one embodiment, the force lever includes a contact member mounted in the one end of the force lever, the contact member abutting against the nose of the pedal arm.

In one embodiment, the contact member includes a head terminating in a distal tip in abutting contact against the nose of the pedal arm.

In one embodiment, the head includes a pair of angled surfaces terminating in the distal tip.

In one embodiment, the contact member includes a neck extending into a receptacle defined in the one end of the force level for mounting the head to the force lever.

In one embodiment, the nose includes an exterior surface having a plurality of surface segments of varying slopes and length for generating the force of varying magnitude on the pedal arm.

In one embodiment, the exterior surface of the nose includes first and second spaced apart rounded surface segments and a straight surface segment therebetween.

Other advantages and features of the present invention will be more readily apparent from the following detailed description of the preferred embodiment of the invention, the accompanying drawings, and the appended claims.

BRIEF DESCRIPTION OF THE DRAWINGS

These and other features of the invention can best be understood by the description of the accompanying FIGURES as follows:

FIG. 3 is an enlarged perspective view of the force lever of the pedal of the present invention;

FIG. 4 is an enlarged exploded perspective view of the force lever of the pedal of the present invention;

FIG. 5 is an enlarged vertical cross-sectional view of the force lever of the pedal of the present invention;

FIG. 6 is a vertical cross-sectional view of the variable force electronic clutch pedal with the pedal arm in its idle disengaged position;

DETAILED DESCRIPTION OF THE EMBODIMENT

Figure 1:
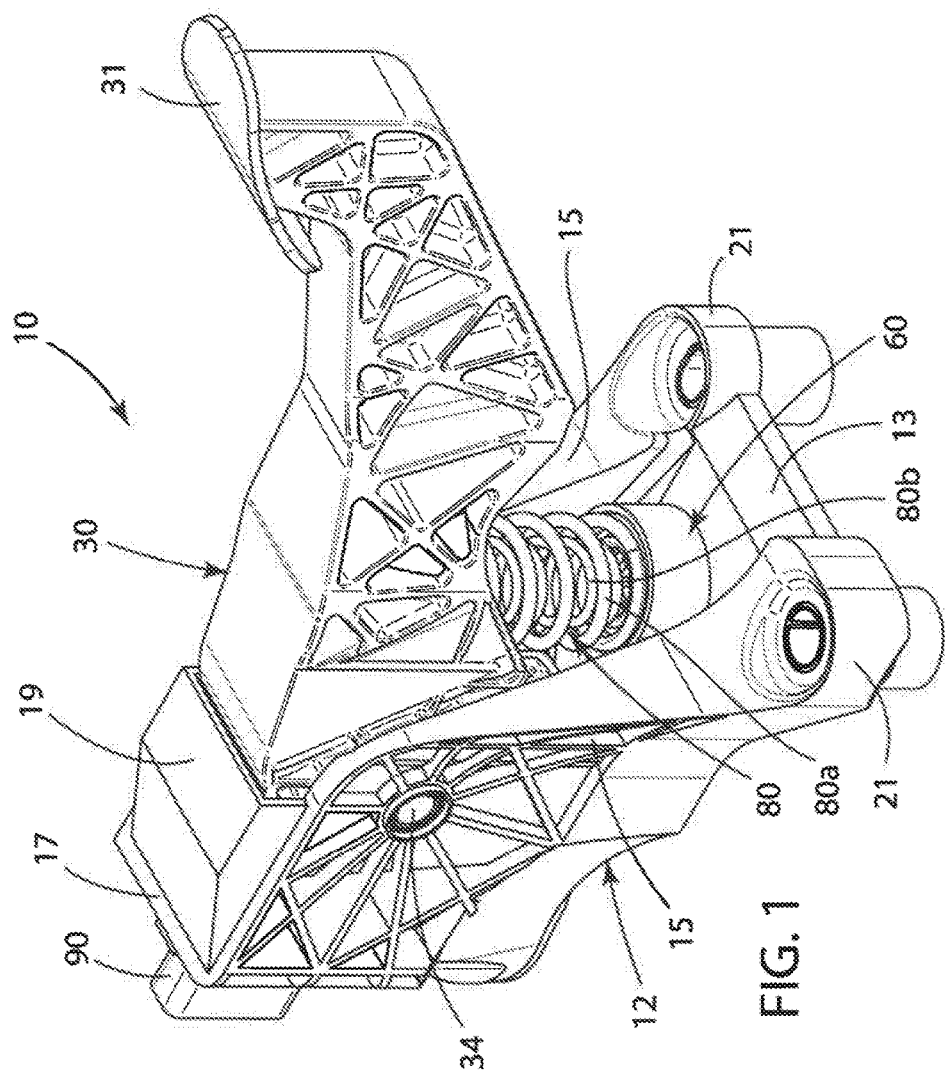
FIG. 1 is a perspective view of a variable force electronic vehicle clutch pedal in accordance with the present invention.

FIGS. 1 through 8 depict a variable force electronic vehicle clutch pedal 10 in accordance with the present invention.

The pedal 10 comprises a pedal housing 12 including a base 13, opposed spaced apart, parallel, and diametrically opposed side walls 15 extending generally normally upwardly and outwardly from respective exterior longitudinal edges of the respective side walls 15, a back wall 17 extending generally upwardly and outwardly from a transverse elongate back edge of the base 13, and a top wall 19 together defining an interior central housing cavity 16. The base 13 also includes and defines a plurality of corner brackets 21 defining respective through-holes for mounting the pedal 10 to the floor (not shown) of a vehicle (not shown).

Figure 2:
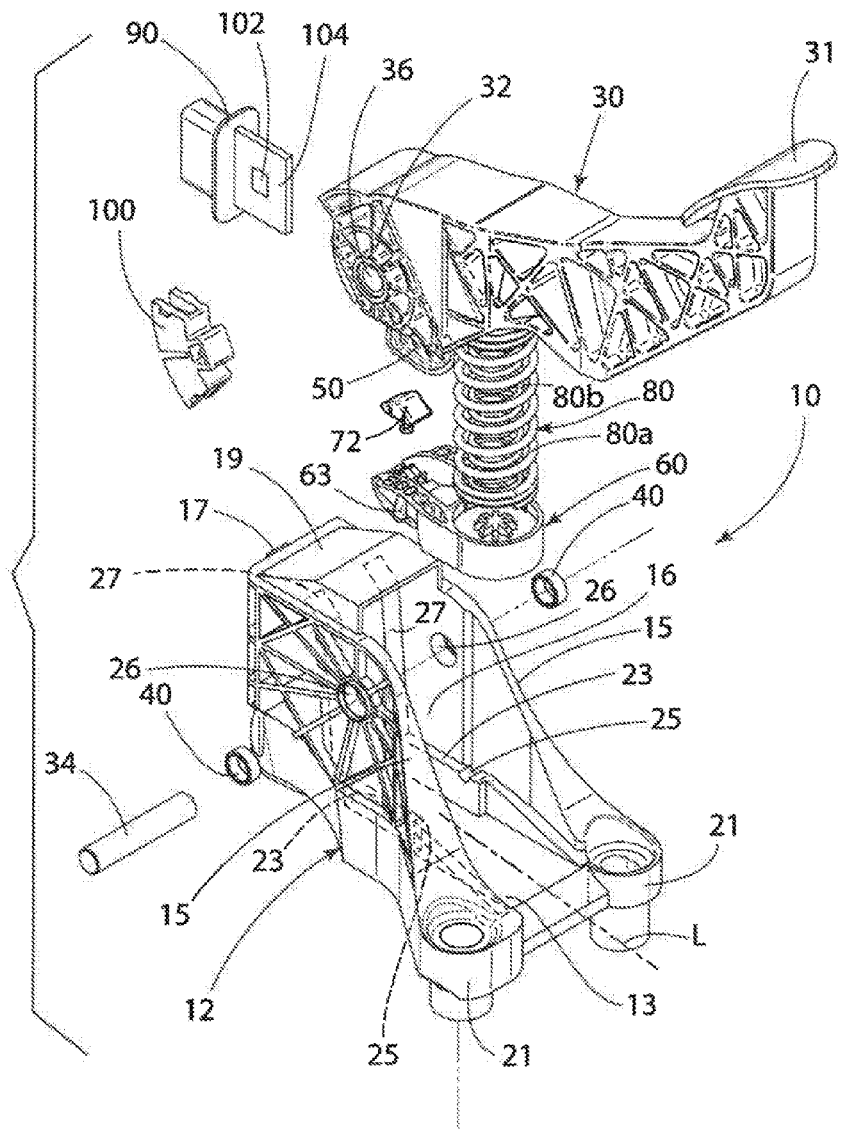
FIG. 2 is an exploded perspective view of the variable force electronic vehicle clutch pedal in accordance with the present invention.

With reference to FIG. 2, the housing 12 includes a pair of interior elongate ledges or platforms 23 extending outwardly from the interior surface of the respective side walls 15 and further protruding upwardly and outwardly from the top exterior face of the base 13 of the housing 12. Each of the ledges 23 includes and defines a generally semi-circular shaped cheek or recess or groove or slot 25. In the embodiment shown, the respective ledges 23 extend in a relationship spaced from and on opposite sides of and generally parallel to, the central longitudinal axis L of the housing 12 with the respective grooves 25 positioned in an opposed and diametrically opposed co-linear relationship.

Each of the side walls 15 further includes an interior elongate shoulder 27 extending between the exterior upper surface of the respective ledges 23 and the top surface of the respective side walls 15. The respective shoulders 27 extend in a relationship normal and on opposite sides of the longitudinal axis L and are located in the housing 12 in a relationship aft and spaced from the respective grooves 20 defined in the respective ledges 17.

Each of the side walls 15 also define a shaft through aperture 26 extending between the respective interior and exterior surfaces thereof in a relationship and direction normal to the direction of the longitudinal axis L. The through apertures 26 are positioned in a diametrically opposed and co-linear relationship and are located in the respective side walls 15 in direction of the longitudinal axis L between and spaced from the respective grooves 25 and the respective shoulders 27 in the respective side walls 15. Each of the through apertures 26 is adapted to receive a ring shaped bearing 40.

The pedal 10 further comprises an elongate pedal arm 30 including a distal foot contact pad 31 and a proximal drum 32 extending into the interior cavity 16 of the pedal housing 12 in a relationship with the pedal arm 30 located above the base 13 and between the respective housing side walls 15. The pedal arm 30 defines a through-hole or aperture 36 terminating in opposed side faces of the drum 32 and extending in a relationship and direction normal to the direction of the housing longitudinal axis L. An elongate generally cylindrical pedal shaft 34 extends through the drum through-hole or aperture 36 and the respective housing side wall through-apertures 26 and the respective bearings 40 for mounting the pedal arm 30 in the housing 16 for clockwise and counterclockwise rotation in and relative to the housing 16.

The pedal 10 still further comprises an assembly for creating and generating a variable resistive force on the pedal arm 30 when a foot force is applied to the pedal arm 30 and the pedal arm 30 is rotated relative to the housing 12 as discussed in more detail below.

The variable force assembly is initially comprised of a bump or nose or projection 50 that extends outwardly from a distal end of the pedal drum 32 and includes an exterior contact surface 52 having, in the embodiment shown, a plurality of exterior contact sections or segments 52a, 52b, and 52c of different lengths, slope, shape, and orientation and, more specifically, a first rounded or curved corner section or segment 52a; an elongate front section or segment 52b extending from an end of the first rounded or curved corner section or segment 52a; and a second rounded or curved corner section 52c opposed and spaced from the first rounded or curved section 52a and extending from an end of the front segment or section 52b opposite the end of the front segment or section 52b coupled to the first rounded or curved corner section 52a.

Thus, in the embodiment show, the front section 52b is located between and coupled to the first and second rounded sections 52a and 52c.

Figure 9:
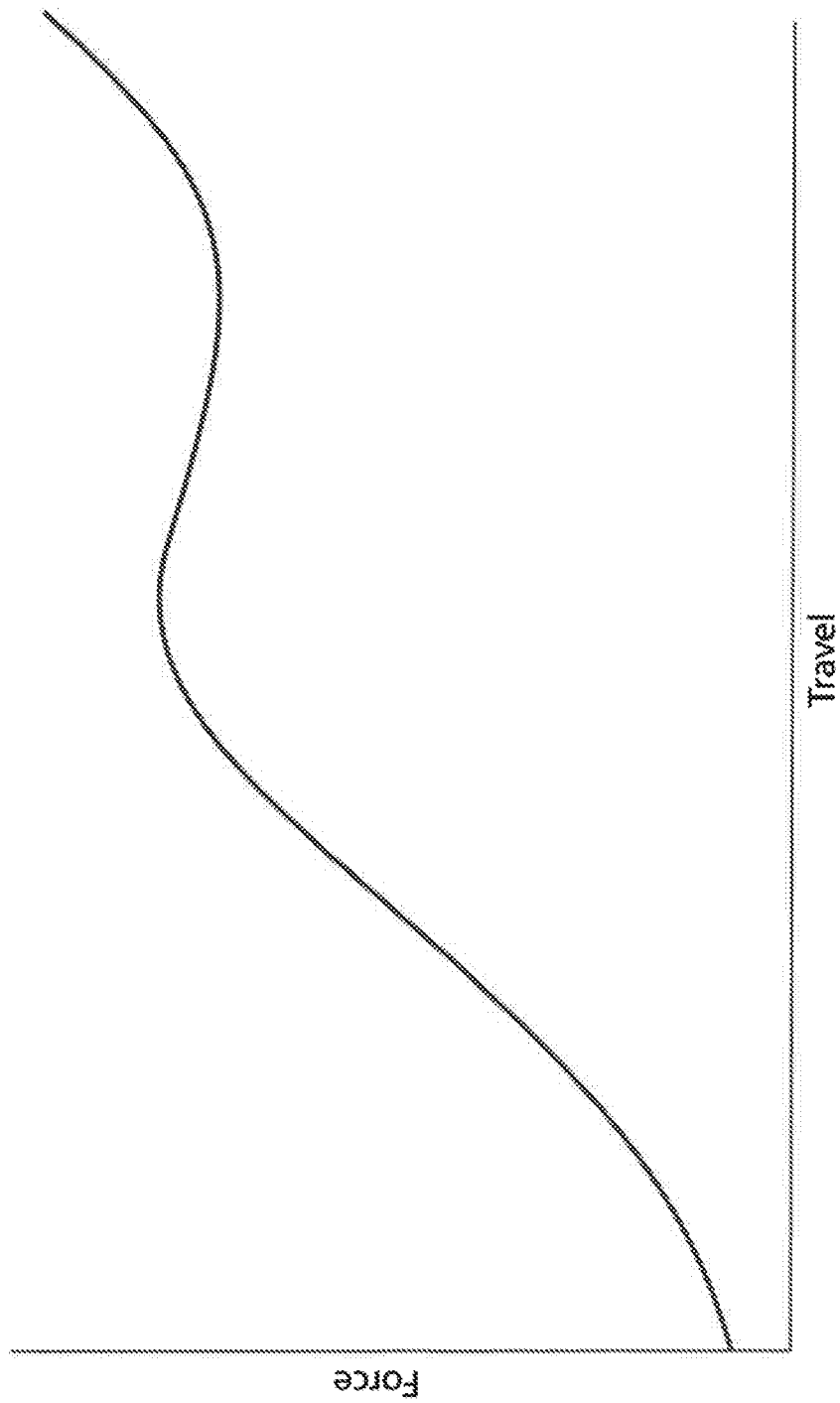
FIG. 9 is a graph of Force versus Travel of the pedal arm of the electronic vehicle clutch pedal in accordance with the present invention.

The FIGS. depict one embodiment of the drum nose or projection 50 and more specifically one embodiment of the sections or segments 52a-52c thereof in which the number, length, slope, shape, location, and orientation of the sections or segments 52a-52c have been selected to generate a pedal resistive force of varying magnitude as shown in FIG. 9. It is understood however that the drum nose or projection 50 may incorporate sections or segments with different length, slope, shape, orientation, and location to generate a different variable pedal force depending on the desired application.

The variable force assembly is also comprised of a pivoting force plate or lever 60 including a central elongate body 62 and a pair opposed and spaced apart distal ends 64 and 66. The distal end 64 of the pivoting lever 60 includes and defines a ring shaped receptacle 68 adapted to receive a distal end 84 of a compressible member 80 as discussed in more detail below. The distal end 66 of the pivoting lever 60 includes and defines an interior receptacle or opening 70 and a bore 71 (FIGS. 4 and 5) together adapted to receive and house a separate drum nose contact member 72 including a head 73 adapted for abutting frictional sliding contact with the sections or segments 52a-52c of the drum nose 50 as also discussed in more detail below.

In the embodiment shown, the head 73 is generally arrow-shaped and includes a pair of converging and angled exterior surfaces 72a and 72b that terminate in a distal curved point or tip 74. An elongate neck 76 depends and extends unitarily outwardly from a lower portion of the head 73. A pair of recesses or slots 72c and 72d are defined in and extend into the underside of the respective surfaces 72a and 72b. As shown in FIGS. 3 and 5, the contact member 72 is received and housed in the pivoting lever 60 with the neck 76 thereof extending through the bore 71 defined in the end 66 of the pivoting lever 60, the head 73 seated in the receptacle 70 defined in the end of the pivoting lever 60, and a pair of prongs 75 in the end 66 of the lever 60 extending into the respective recesses or slots 72c and 72d in the head 73 of the contact member 72 for mounting the contact member 72 to the end 66 of the lever 60.

The pivoting lever 60 additionally defines a pair of diametrically opposed and co-linear trunnions or ears or projections 63 (FIGS. 3 and 4) projecting outwardly from the respective exterior side faces of the body 62 of the pivoting lever 60. In the embodiment shown, the ears 63 are generally centrally positioned on the pivoting lever 60 and located on the body 62 between and spaced from the respective ends 64 and 66 of the pivoting lever 60.

The pivoting lever 60 is located and mounted in the interior cavity 16 of the pedal housing 12 in a relationship wherein: the pivoting lever 60 extends in the same direction as and more specifically in a relationship co-linear with the longitudinal axis L of the pedal housing 12; the respective ears 63 thereof are seated in the respective grooves 23 defined in the respective ledges 23 defined in the interior of the pedal housing 12 for pivoting and mounting the lever 60 in the housing 12 for pivoting movement relative and about the housing 12; the end 66 of the pivoting lever 60 is positioned in a relationship opposed to the nose 50 of the drum 32 and more specifically in a relationship with the tip 74 of the nose contact member 72 in abutting frictional sliding contact with the exterior surface 52 of the nose 50 of the drum 32; and the opposed end 64 of the pivoting lever 60 in abutting contact with an end of the compressible member 80.

Thus, in accordance with the present invention, the pivoting lever 60 is located and mounted in the interior cavity 16 of the housing 12 in a relationship spaced, opposed, above and generally parallel relationship to the exterior top surface of the base 13 of the housing 12; in a relationship opposed and spaced and below the drum 32 and underside of the pedal arm 30 and more specifically in a relationship with the pivoting lever 60 located between and spaced from the housing base 13 and the pedal arm 30; in a relationship and location in the direction of the longitudinal axis L wherein the respective ears 63 on the pivoting lever 60 are located between and spaced from the drum nose 50 and the end of the base 13 of the housing 12; and further in a relationship wherein the lever 60 is adapted for pivoting or teetering up and down movement about the pivot point defined by the respective grooves 25 and ears 63 defined in the respective interior housing ledges 23 in response to the rotation of the pedal arm 30 as discussed in more detail below.

The variable force assembly still further comprises the compressible member 80 which, in the embodiment shown, is in the form of a pair of telescoping helical compression springs 80a and 80b located and mounted in the pedal 10 in a relationship with a first distal end of the respective compressive springs 80a and 80b located and seated in a ring shaped receptacle 31 defined in a lower face or underside of the pedal arm 30 and an opposed second distal end of the respective compression springs 80a and 80b located and seated in the ring shaped receptacle 68 defined in the distal end 64 of the lever 60.

Thus, in the embodiment shown, the compressible member 80 is located and positioned in the pedal 10 in a relationship and position: aft of the drum 32 and nose 50 of the pedal arm 30; extending between the base 13 of the housing 12 and the underside of the pedal arm 30; and in a direction generally transverse to the base 13 and longitudinal axis L of the housing 12.

The pedal 10 still further comprises an assembly for sensing the position of the pedal arm 30 which in the embodiment shown is a non-contacting sensor assembly of the type disclosed in for example U.S. Pat. No. 6,515,473 assigned to CTS Corporation.

Thus, in the embodiment shown, a magnet 100 is mounted to the drum 32 of the pedal arm 30 and a Hall sensor 102 is mounted on a printed circuit board 104 mounted to the end of a sensor connector 90. The connector 90 is mounted to and extends through the back wall 17 of the pedal housing 12 with the Hall sensor 102 located in the interior housing cavity 16 in a relationship spaced and opposed to the magnet 100.

The Hall sensor 102 is adapted to sense changes in voltage resulting from changes in the magnetic field resulting from changes in the position of the magnet 100 relative to the Hall sensor 102 resulting from changes in the rotational position of the pedal arm 30 relative to the pedal housing 12, all for determining the position of the pedal arm 30 and directing the vehicle electronic control unit (ECU) (not shown) of the pedal 10 to initiate certain vehicle operative conditions including, for example, clutch engagement and disengagement conditions for gear changes.

Still further, and although not shown in any of the FIGS., the pedal 10 comprises the following additional features: either a two magnet non-contacting sensor design press fit into the drum 32 of the pedal arm 14 if required for redundancy/ASIL B or a one magnet non-contacting sensor design; a connector and press-fit PCA/compliant pin incorporated into one of the side walls 15 of the pedal housing 12; an eight to ten pin connector for dual slope output and 12 V supply for switches; and a printed circuit assembly (PCA) incorporating internal electronics adapted to use electrical slope as switch conditions.

A description of the operation of the pedal 10 to create and generate a variable force of increasing and decreasing magnitude on the pedal arm 30 as represented in the graph of FIG. 9 will now be described.

FIGS. 1 and 6 depict the pedal 10 and, more specifically the pedal arm 30 thereof in its idle or disengaged position and orientation relative to the pedal housing 12. In this position, and as shown in FIG. 3, the contact member 72 on the lever 60 is positioned in a relationship abutting against an aft end of the first rounded section 52a of the nose 50 and a fore end of the front segment 52b of the nose 50. Moreover, in this position, the lever $0 is positioned in a relationship generally parallel and spaced from the exterior surface of the base 13 of the housing 12 and the compressible member 80 is fully extended and not compressed.

Figure 7:
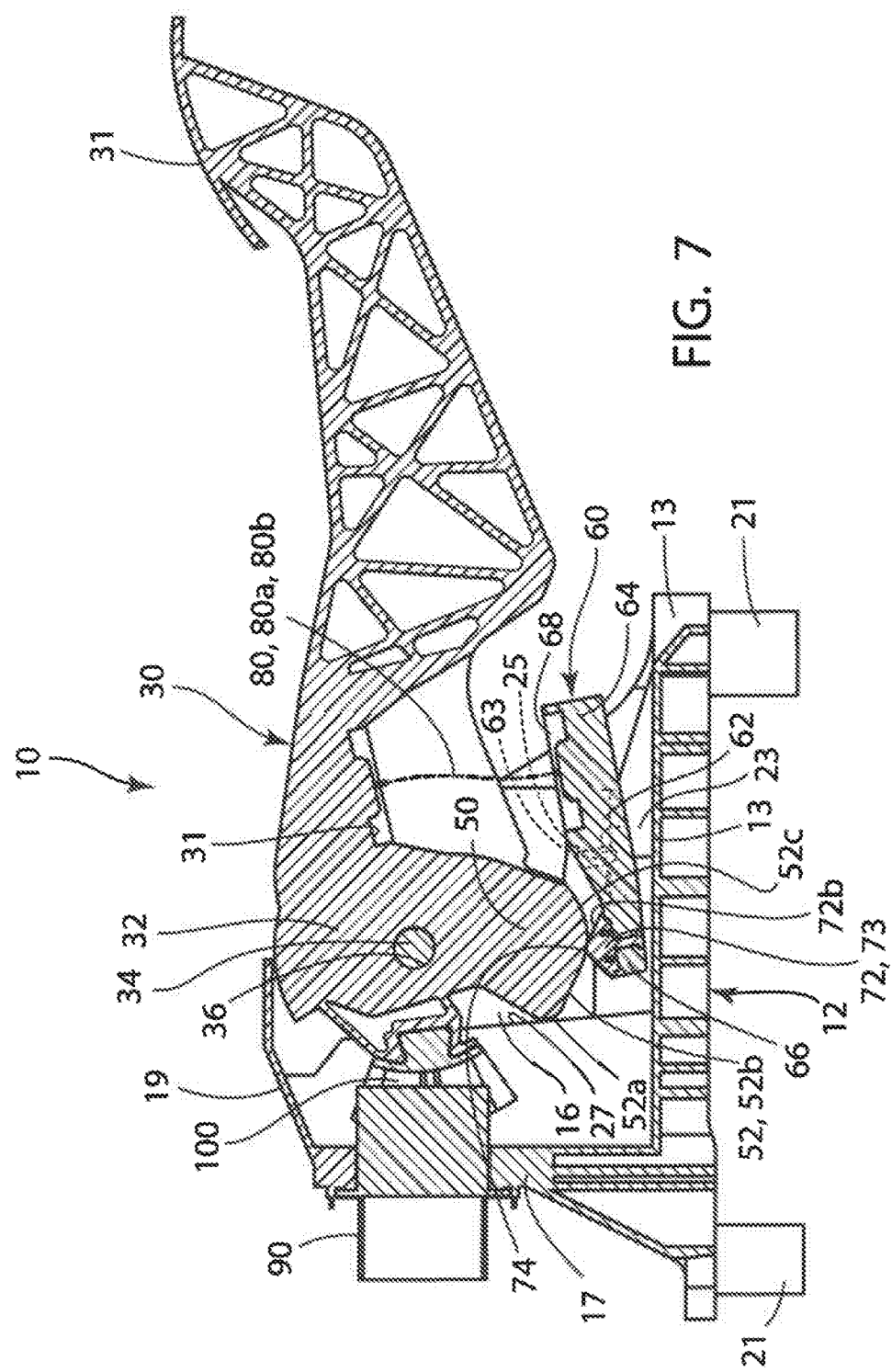
FIG. 7 is a vertical cross-sectional view of the variable force electronic vehicle clutch pedal with the pedal arm in a mid-point engaged rotated position.
Figure 8:
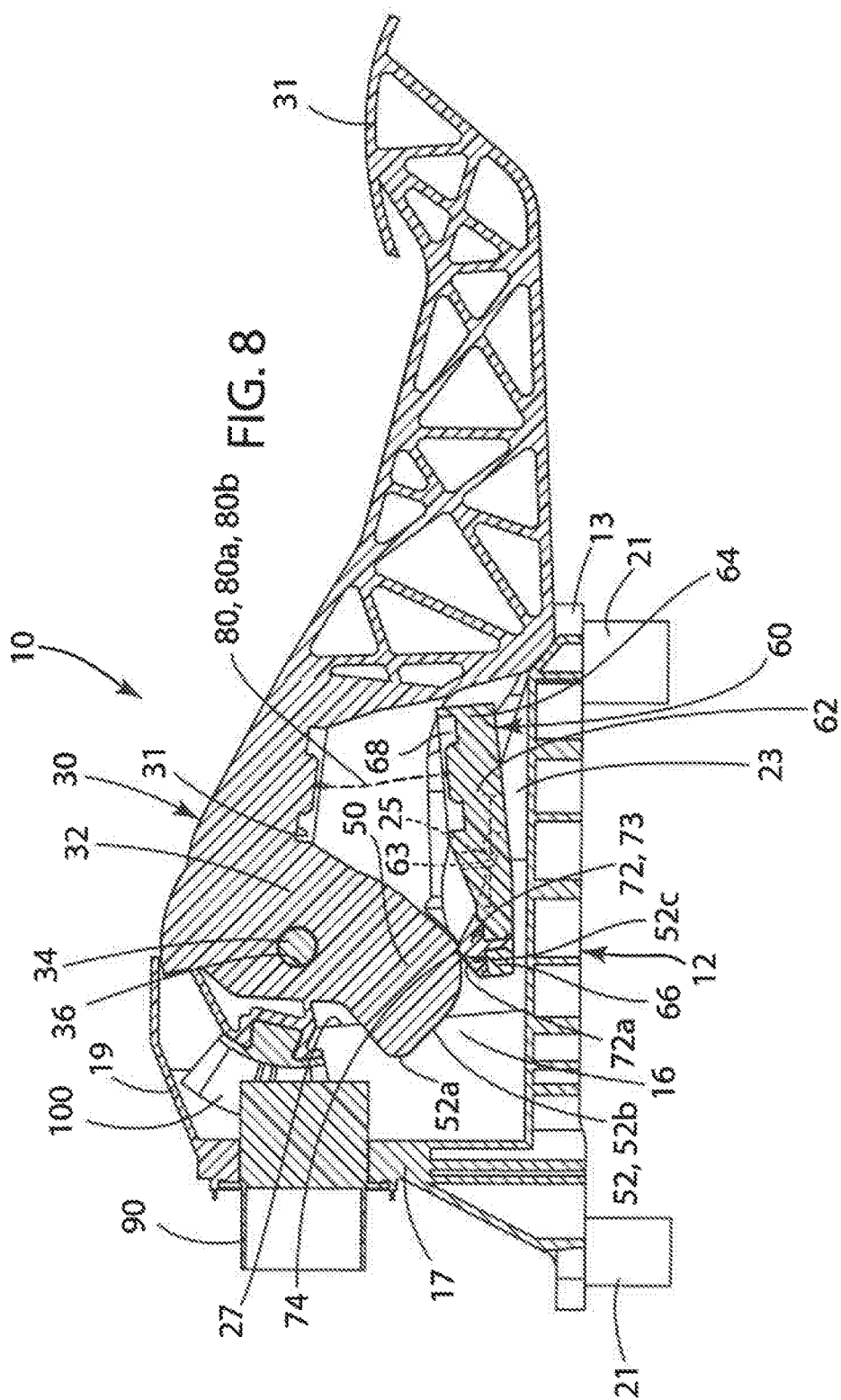
FIG. 8 is a vertical cross-sectional view of the variable force electronic vehicle clutch pedal with the pedal arm in its fully engaged rotated position.

The pedal arm 30 is adapted for clockwise rotation from its FIG. 6 disengaged position into its FIG. 7 and FIG. 8 engaged positions for generating a variable force on the pedal arm 30 as described in more detail below.

In accordance with the present invention, the clockwise rotation of the pedal arm 30 causes and results in the clockwise rotation of the drum 32 of the pedal arm 30 which in turn causes and results in the clockwise rotation of the nose 50 of the drum 32 which by virtue of the slope and shape and size of the nose 50 and more specifically the slope and shape of the front surface segment 52b thereof causes the sliding movement of the contact member 72 and more specifically the head 73 of the lever 60 against and along the length of the front surface segment 52b of the nose 50 which in turn causes and results in the downward pivoting movement of the end 66 of the lever 60 in the direction of and towards the exterior top face of the base 13 of the housing 12 which in turn causes and results in the upward pivoting movement of the opposite end 64 of the lever 60 away from the base 13 and in the direction of the underside of the pedal arm 30 which in turn causes and results in the compression of the compressible member 80 which in turn causes the end of the compressible member 80 abutted against the underside of the pedal arm 30 to exert a force against the underside of the pedal arm 30 which in turn results in the application of a resistive force on the foot contact pad 31 of the pedal arm 30 which is felt by the foot of the operator of the vehicle.

In accordance with the present invention, the length, slope, configuration, and size of the nose 50 of the drum 32 and more specifically the length, slope, and configuration of the exterior contact surface segments 52a-52c of the exterior surface 52 thereof, the length of the lever 60, and the length and size of the compressible member 80 are selected and designed to generate and create the variably initially increasing, then decreasing, and then increasing forward and reverse pedal stroke or resistive force in response to travel of the pedal arm 30 as shown graphically in FIG. 9 that, in accordance with the present invention, is adapted to simulate the variable clutch force exerted in clutch pedals with a mechanical clutch engagement and disengagement linkage.

The electrical output of the pedal may be either a single slope output with dual switches or a dual slope output to protect the ASIL requirement with a dual redundancy ASIC. Dual slope circuitry will allow for use of lop to initiate switch conditions.

Numerous variations and modifications of the embodiment described above may be effected without departing from the spirit and scope of the novel features of the invention. It is to be understood that no limitations with respect to the variable force electronic vehicle clutch pedal illustrated herein are intended or should be inferred. It is, of course, intended to cover by the appended claims all such modifications as fall within the scope of the claims.

What is claimed is:

1. An electronic vehicle clutch pedal comprising:
   a housing;
   a pedal arm coupled to and rotatable relative to the housing in response to the application of a foot force against the pedal arm in a first vehicle clutch pedal engagement direction and including a distal drum rotatable relative to the housing and defining a contact surface including a plurality of surface segments with different slopes including a first rounded segment, a second rounded segment spaced from the first rounded segment, and an elongate straight surface segment therebetween;
   a force lever pivotable about the housing and having a contact member abutted against the contact surface on the drum of the pedal arm; and
   a compressible member having a first end abutted against the pedal arm and a second end abutted against the force lever;
   whereby the application of the foot force against the pedal arm in the first vehicle clutch pedal engagement direction results in the pivoting of the force lever and the sliding of the contact member of the force lever along and against the first, second, and third surface segments of the drum of the pedal arm for generating a force of increasing, then decreasing, and then increasing magnitude on the pedal arm in the first vehicle clutch pedal engagement direction of the pedal arm.

2. The electronic vehicle clutch pedal of claim 1 wherein the contact member is mounted on a first end of the force lever.

3. The electronic vehicle clutch pedal of claim 2 wherein the contact member includes a head terminating in a distal tip abutted against the contact surface of the drum of the pedal arm.

4. An electronic vehicle clutch pedal comprising:
   a housing;
   a pedal arm coupled to and rotatable relative to the housing and including a distal drum rotatable relative to the housing and defining a contact surface including a plurality of surface segments with different slopes;
   a force lever pivotable about the housing and having a first lever end abutted against the contact surface on the drum of the pedal arm; and
   a compressible member having a first member end abutted against the pedal arm and a second member end abutted against a second lever end of the force lever;
   whereby the rotation of the pedal arm results in the pivoting of the force lever and the exertion of a force of varying magnitude on the pedal arm by the compressible member;
   a contact member mounted on the first lever end of the force lever and abutted against the contact surface of the drum of the pedal arm, the contact member including a head terminating in a distal tip abutted against the contact surface of the drum of the pedal arm; and
   a receptacle defined in the first lever end of the force lever, the contact member being located and mounted in the receptacle defined in the first lever end of the force lever.

5. An electronic vehicle clutch pedal comprising:
   a housing including a base and a pair of spaced apart side walls together defining an interior cavity;
   a pedal arm coupled to and rotatable relative to the housing in response to the application of a foot force against the pedal arm in a first vehicle clutch pedal engagement direction and including a distal drum extending into the cavity of the pedal housing and between the spaced apart side walls, the drum including a nose having an exterior contact surface including a plurality of surface segments with different lengths and slopes;

a force lever pivotable about the housing and including a contact member at a first end adapted for sliding contact against the plurality of the surface segments of the contact surface on the nose of the drum; and a compressible member having a first end abutted against an underside of the pedal arm and a second end abutted against a second end of the force lever;

whereby the pedal arm is rotatable about the pedal housing in response to the application of the foot force against the pedal arm in the first vehicle clutch pedal engagement direction to cause the pivoting of the force lever relative to the housing and the sliding contact of the contact member of the force lever against the plurality of the surface segments of different lengths and slopes of the nose of the drum of the pedal arm to cause the compressible member to exert a variable force against the pedal arm of increasing, then decreasing, and then increasing magnitude on the pedal arm in the first vehicle clutch pedal engagement direction of the pedal arm.

6. An electronic vehicle clutch pedal comprising:

a housing including a base having a pair of spaced apart ledges defining respective spaced apart and co-linear slots;

a force lever including a pair of spaced apart ears, the force lever being seated on the base of the housing in a relationship with the respective pair of ears seated in the respective slots defined in the respective ledges for mounting the force lever for pivoting movement about the base of the housing;

a contact member mounted at one end of the force lever and including a head including a pair of angled surfaces terminating in a distal tip;

a pedal arm extending into and rotatable about the housing and including a nose in abutting contact with the distal tip of the head of the contact member mounted at the one end of the force lever;

a compressible member including opposed ends abutted against the pedal arm and the force lever respectively;

whereby the rotation of the pedal arm relative to the housing results in the rotation of the nose of the pedal arm which results in the movement of the force lever which results in the pivoting of the force lever which results in the compression of the compressible member and the application of a force of varying magnitude on the pedal arm.

7. The electronic vehicle clutch pedal of claim 6 wherein the contact member includes a neck extending into a receptable defined in the one end of the force lever for mounting the head to the force lever.

8. The electronic vehicle clutch pedal of claim 6 wherein the nose includes an exterior surface having a plurality of surface segments of varying slopes and length for generating the force of varying magnitude on the pedal arm.

9. The electronic vehicle clutch pedal of claim 8 wherein the exterior surface of the nose includes first and second spaced apart rounded surface segments and a straight surface segment therebetween.

* * * * *